(12) United States Patent
Hwang et al.

(10) Patent No.: US 7,973,956 B2
(45) Date of Patent: Jul. 5, 2011

(54) HIGH SPEED PRINTING METHOD AND APPARATUS

(75) Inventors: Tae-kyung Hwang, Suwon-si (KR); Woo-seong Yang, Suwon-si (KR); Yong-in Eom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1033 days.

(21) Appl. No.: 11/582,475

(22) Filed: Oct. 18, 2006

(65) Prior Publication Data

US 2007/0153321 A1 Jul. 5, 2007

(30) Foreign Application Priority Data

Dec. 29, 2005 (KR) .................. 10-2005-0133154

(51) Int. Cl.
 *G06F 3/12* (2006.01)
(52) U.S. Cl. ........ 358/1.15; 358/1.1; 358/1.9; 358/1.13; 358/1.14; 358/1.16
(58) Field of Classification Search .................. 358/1.1, 358/1.9, 1.13, 1.14, 1.15, 1.16
 See application file for complete search history.

(56) References Cited

U.S. PATENT DOCUMENTS

| | | | | |
|---|---|---|---|---|
| 5,502,804 A * | 3/1996 | Butterfield et al. | ........... | 715/209 |
| 5,594,860 A * | 1/1997 | Gauthier | ................. | 345/543 |
| 6,757,073 B1 * | 6/2004 | Kuroda | ............... | 358/1.2 |
| 6,934,051 B1 * | 8/2005 | Ogura | ............... | 358/1.17 |
| 7,069,327 B1 * | 6/2006 | Fabre | ............... | 709/227 |
| 2003/0231320 A1 * | 12/2003 | Tsunekawa | ............... | 358/1.2 |
| 2004/0015781 A1 * | 1/2004 | Brown et al. | ............... | 715/513 |
| 2004/0066529 A1 * | 4/2004 | Wu et al. | ............... | 358/1.15 |
| 2005/0105128 A1 * | 5/2005 | Konno | ............... | 358/1.15 |
| 2005/0200871 A1 * | 9/2005 | Miyata | ............... | 358/1.11 |
| 2005/0286063 A1 * | 12/2005 | Owen et al. | ............... | 358/1.13 |
| 2006/0170949 A1 * | 8/2006 | Yamamoto | ............... | 358/1.13 |
| 2008/0180707 A1 * | 7/2008 | Kanematsu | ............... | 358/1.9 |
| 2009/0141292 A1 * | 6/2009 | Adams et al. | ............... | 358/1.6 |

FOREIGN PATENT DOCUMENTS

| | | |
|---|---|---|
| JP | 07-009710 | 1/1995 |
| JP | 10-100483 | 4/1998 |
| JP | 11-203064 | 7/1999 |
| JP | 2000-085212 | 3/2000 |
| JP | 2005-149347 | 6/2005 |
| KR | 1019980054991 | 4/1999 |
| KR | 1020040080660 | 9/2004 |

\* cited by examiner

*Primary Examiner* — Chan S Park
*Assistant Examiner* — Kenneth Kwan
(74) *Attorney, Agent, or Firm* — Roylance, Abrams, Berdo & Goodman, L.L.P.

(57) ABSTRACT

A high speed printing method and apparatus are provided, in which provided print data is rendered and a rendered result in response to a print request of the print data is transmitted, and an image of the rendered result is formed, wherein the rendering of the provided print data is performed by a host, and the forming of the image of the rendered result is performed by an image forming device connected to the host. Accordingly, a host performs pre-rendering before a print request is input, and when the print request is input, an image forming device receives the rendered result from the host and prints the rendered result. Thus, the image forming device can perform a printing job at a high speed regardless of the amount of print data.

17 Claims, 3 Drawing Sheets

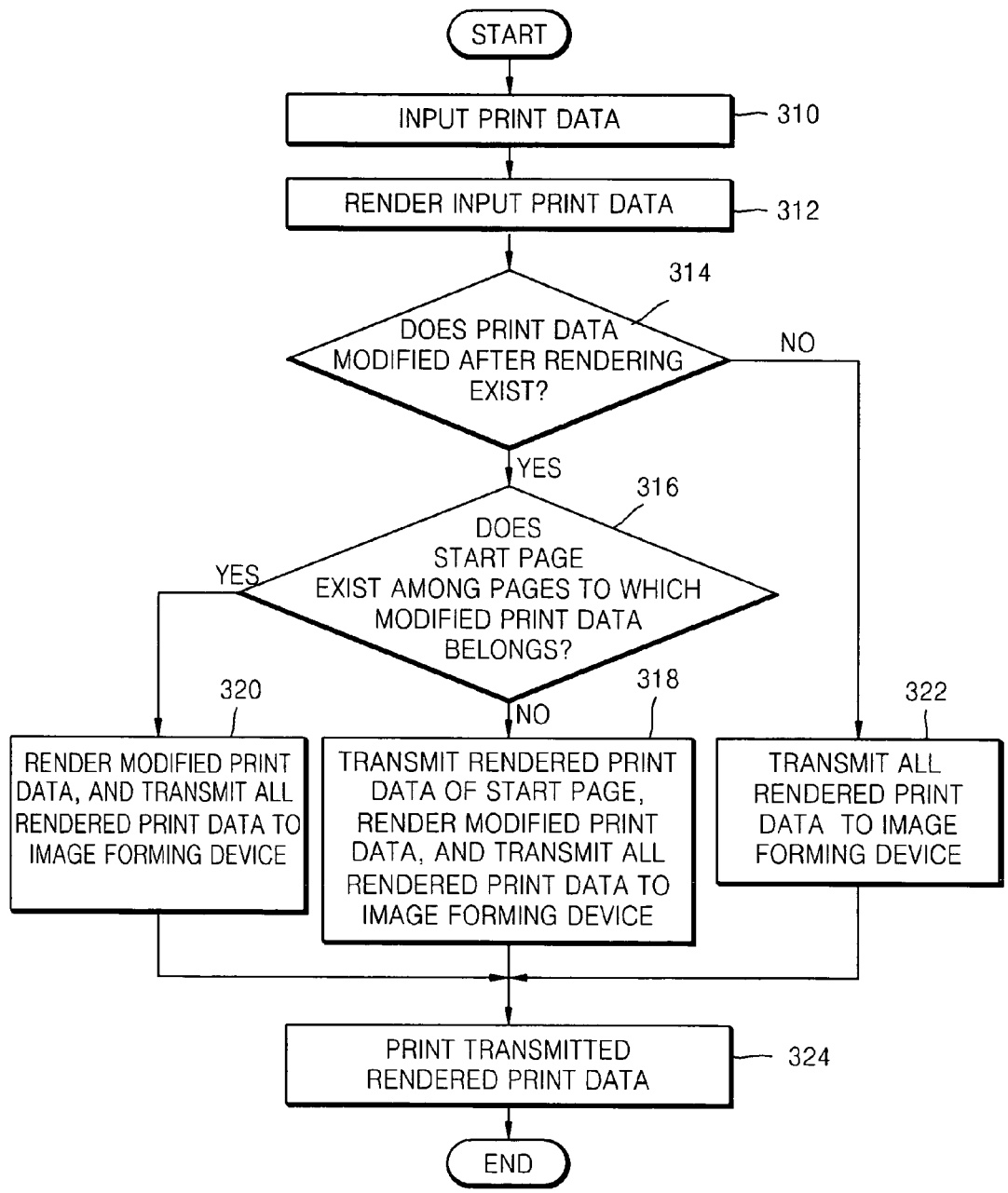

HIGH SPEED PRINTING METHOD AND APPARATUS

CROSS-REFERENCE TO RELATED PATENT APPLICATION

This application claims the benefit under 35 U.S.C. §119(a) of Korean Patent Application No. 10-2005-0133154, filed on Dec. 29, 2005, in the Korean Intellectual Property Office, the entire disclosure of which is hereby incorporated by reference.

FIELD OF THE INVENTION

The present invention relates to rendering performed by a host connected to an image forming device such as a printer. More particularly, the present invention relates to a high speed printing method and apparatus, by which rendering is performed in advance before a print command is input, and when the print command is input, an image forming device receives a rendered result from a host and performs a print job.

DESCRIPTION OF THE RELATED ART

To print data in an image forming device such as a printer, the print data must be processed for the image forming device to recognize the print data. This processing is called rendering.

Such rendering can be performed by an image forming device or a host connected to the image forming device. Rendering of the host is performed by a driver installed in the host, for example, a graphic device interface (GDI)-series driver.

When rendering is performed by the host, a process of printing print data in the image forming device comprises inputting a print command into the host, performing rendering in the host, and receiving and printing the rendered print data from the image forming device.

That is, according to a conventional printing method, rendering is performed after a print command is input. Thus, a print lead time, which is the time from when a print command is input to when a first printed matter is output, is proportional to the time required for the rendering.

Accordingly, in the conventional printing method, since an increase of the amount of print data results in an increase of the time required for the rendering, that is, an increase of the print lead time, the amount of print data significantly affects the print lead time, which is an index of product competitiveness of the image forming device. Accordingly, there is a need for an improved method and apparatus for printing print data at high speed regardless of the amount of the print data.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a high speed printing method, by which rendering is performed in advance before a print command is input, and when the print command is input, an image forming device receives the rendered result from a host and performs a print job.

In an exemplary implementation, a high speed printing apparatus is provided, by which rendering is performed in advance before a print command is input, and when the print command is input, an image forming device receives the rendered result from a host and performs a print job.

In another exemplary implementation, a computer readable recording medium stores a computer program for executing a high speed printing method, by which rendering is performed in advance before a print command is input, and when the print command is input, an image forming device receives the rendered result from a host and performs a print job.

According to an aspect of exemplary embodiments of the present invention, there is provided a high speed printing method, in which print data is rendered and the rendered result is transmitted in response to a print request of the print data; and an image of the rendered result is formed, wherein the rendering of the provided print data is performed by a host, and the forming of the image is performed by an image forming device connected to the host.

In an exemplary implementation, the rendering of the provided print data may comprise rendering the print data in response to a pre-rendering request of the print data; and transmitting the rendered result in response to a print request of the print data.

In another exemplary implementation, the rendering of the provided print data may comprise rendering the print data in response to a pre-rendering request of the print data; determining whether the print data has been modified after the rendering of the print data; if it is determined that the print data has been modified, rendering the modified print data; modifying the result rendered in the rendering of the print data using the result rendered in the rendering of the modified print data; transmitting the modified rendered result; and if it is determined that the print data has not been modified, transmitting the result rendered in the rendering of the print data, wherein the print request is input when it is determined that the print data has not been modified or after the rendering of the print data or the modifying of the result rendered.

In still another exemplary implementation, in the determining that the print data has been modified, print data of pages to which the modified print data belongs may be rendered, and in the modifying of the result rendered, a result rendered in the rendering of the print data, which corresponds to the result rendered in the rendering of the modified print data, may be replaced with the result rendered in the rendering of the print data, and a result rendered in the rendering of the modified print data, which does not correspond to the result rendered in the rendering of the print data, may be added to the result rendered in the rendering of the print data.

In a further exemplary implementation, the determining of the modified print data may comprise determining whether a start page exists among the pages to which the modified print data belongs; and rendering the modified print data. The modifying of the result rendered may comprise, if it is determined that the start page exists, modifying the result rendered in the rendering of the print data using the result rendered from the determining of the modified print data; and if it is determined that the start page does not exist, transmitting the rendered result of the start page during the rendering of the modified print data.

According to another aspect of exemplary embodiments of the present invention, there is provided a high speed printing apparatus, in which a host renders provided print data in response to a pre-rendering request signal and transmits the rendered result in response to a print request signal; and an image forming device forms an image of the transmitted rendered result.

According to another aspect of exemplary embodiments of the present invention, there is provided a computer-readable recording medium storing a computer-readable program for executing a high speed printing method, in which print data is rendered and the rendered result is transmitted in response to a print request of the print data; and an image of the rendered result is formed, wherein the rendering of the provided print data is performed by a host, and the forming of the image is performed by an image forming device connected to the host.

BRIEF DESCRIPTION OF THE DRAWINGS

The above and other objects, features and advantages of certain exemplary embodiments of the present invention will be more apparent from the following description taken in conjunction with the accompanying drawings in which:

FIG. 3 is a flowchart illustrating a high speed printing method according to an exemplary embodiment of the present invention.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
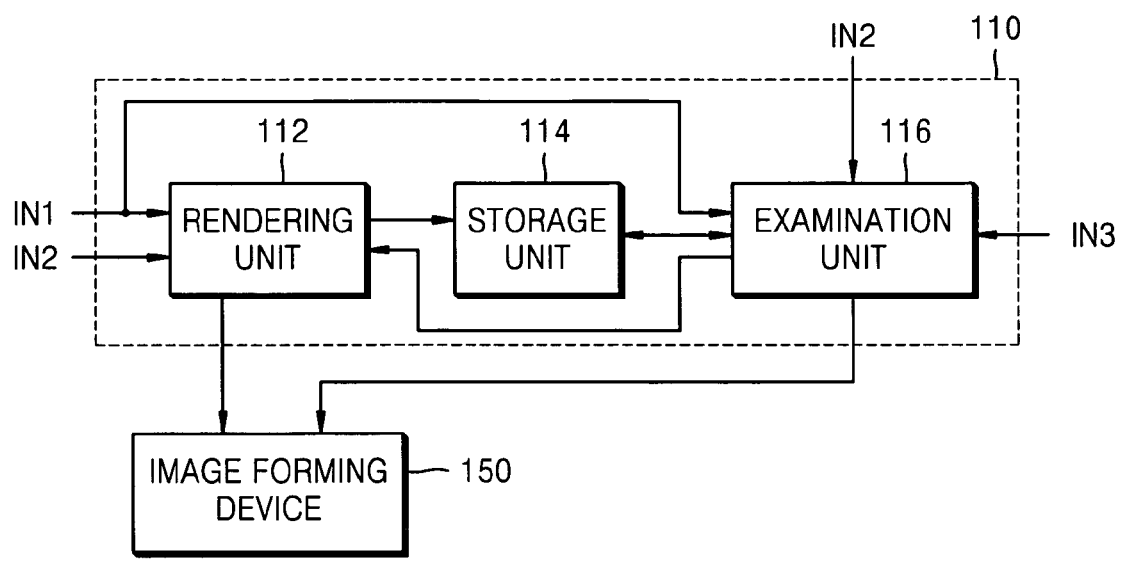
FIG. 1 is a block diagram of a high speed printing apparatus according to an exemplary embodiment of the present invention.

FIG. 1 is a block diagram of a high speed printing apparatus according to an exemplary embodiment of the present invention. Referring to FIG. 1, the high speed printing apparatus includes a host 110 and an image forming device 150. The host includes a rendering unit 112, a storage unit 114, and an examination unit 116.

A personal computer (PC) is an example of the host 110, and a printer or a multifunction peripheral (MFP) having a printing function is an example of the image forming device 150.

The host 110 and the image forming device 150 can be connected to each other in a wired or wireless manner.

In order for print data to be printed by the image forming device 150, the print data must be recognized by the image forming device 150. A job required to be recognized by the image forming device 150 is rendering of the print data.

The rendering can be performed by the image forming device 150 or the host 110. In an exemplary embodiment of the present invention, the rendering is performed by the host 110.

In order for the rendering to be performed by the host 110, a driver corresponding to the image forming device 150 must be installed in the host 110. A GDI-series driver is an example of such a driver.

In addition, an application program for generating print data also must be installed in the host 110. A document editing program, such as MS-Word of MICROSOFT, can be an example of the application program.

The rendering unit 112 renders print data, which is input via an input terminal IN1, in response to a pre-rendering request signal input via another input terminal IN2 and transmits the rendered print data to the image forming device 150 in response to a print request signal input via another input terminal IN3. Hereinafter, all of the rendering and the transmission may be performed in page format.

The pre-rendering request signal is generated earlier than the print request signal. As a result, the rendering can be performed even before the print request signal is input to the host 110.

The pre-rendering request signal can be generated by selecting a pre-rendering menu on an interface of the document editing program, and the print request signal can be generated by selecting a print menu on the interface.

The pre-rendering menu may be included in a menu having high usage frequency in the document editing program. For example, a storage menu for storing a document may include the pre-rendering menu. In this case, when a user selects the storage menu to store an editing document while the user is editing the document using the document editing program, print data of the selected document is stored and rendered. Thus, the user does not have to consider that the user must select the pre-rendering menu before selecting the print menu.

The print data rendered by the rendering unit 112 is transmitted to the storage unit 114, and the storage unit 114 may temporarily store the transmitted rendered print data. In this case, the temporarily stored rendered print data may be deleted if the document editing program ends without selection of the print menu or if the rendered print data is printed by the image forming device 150.

The examination unit 116 examines whether the pre-rendering request signal input via the input terminal IN2 is a first input pre-rendering request signal with respect to print data to be rendered (hereinafter, current print data).

If it is examined that the pre-rendering request signal input via the input terminal IN2 is not the first input pre-rendering request signal with respect to the current print data, or if a print request signal is input via the input terminal IN3, the examination unit 116 examines whether the current print data has been modified since latest rendering. If it examined that the current print data has not been modified, the examination unit 116 transmits a latest rendered result to the image forming device 150.

If it is examined that the current print data has been modified, the examination unit 116 examines whether a start page exists among pages to which the modified print data belongs. If it is examined that the start page exists, the examination unit 116 instructs the rendering unit 112 to render print data of the pages to which the modified print data belongs. If it is examined that the start page does not exist, the examination unit 116 instructs the rendering unit 112 to render the print data of the pages to which the modified print data belongs and transmits rendered print data of the start page to the image forming device 150.

The image forming device 150 receives the rendered print data from the rendering unit 112 or the examination unit 116 and prints the received rendered print data.

Figure 2:
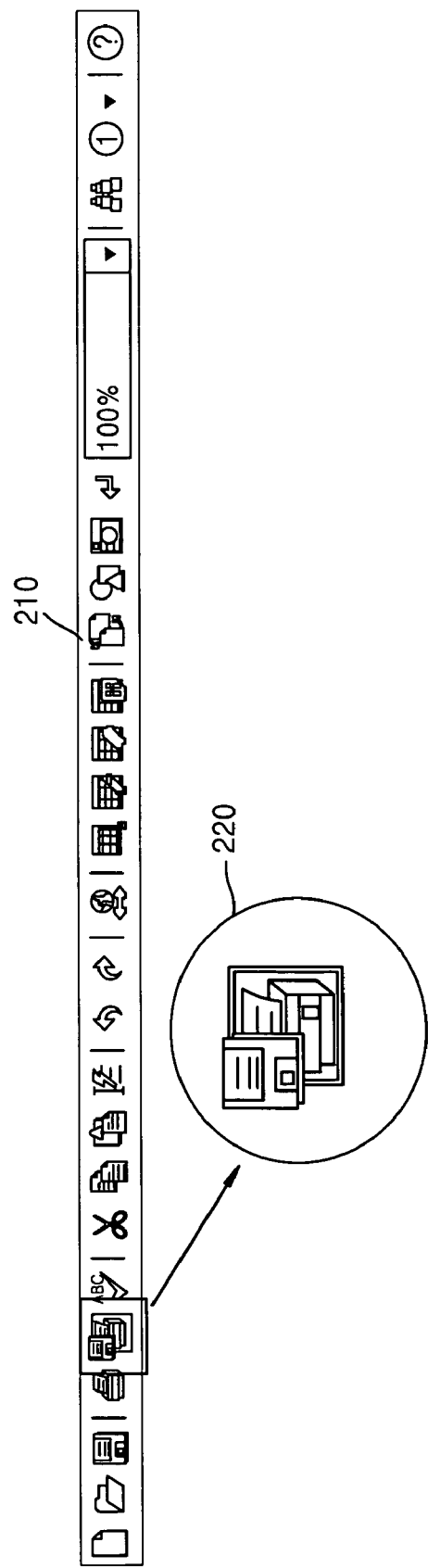
FIG. 2 is a reference diagram for explaining the high speed printing apparatus according to an exemplary embodiment of the present invention.

FIG. 2 is an illustration of a menu bar 210 on an interface of a document editing program and an exemplary pre-rendering menu 220 included in the menu bar 210. When the user clicks the pre-rendering menu 220 included in the menu bar 210, print data of a document edited using the document editing program is stored and rendered.

FIG. 3 is a flowchart illustrating a high speed printing method according to an exemplary embodiment of the present invention. The high speed printing method includes steps 310 through 324, which perform pre-rendering before a print request; and if the print request is input, the image forming device 150 receives the rendered result from the host 110 and prints the received rendered result.

Referring to FIG. 3, in step 310, print data is input to the rendering unit 112. In step 312, the rendering unit 112 renders the input print data in response to a pre-rendering request signal.

In step 314, the examination unit 116 determines whether the input print data has been modified since step 312. If it is determined that the input print data has been modified, in step 316, the examination unit 116 determines whether a start page exists among pages to which the modified print data belongs.

If it is determined that the start page does not exist, in step 318, the rendering unit 112 renders the modified print data, transmits the print data of the start page, which was rendered in step 312, to the image forming device 150 while rendering the modified print data, and then transmits the rendered result to the image forming device 150.

The rendered result transmitted in step 318 is 'a result rendered in step 312' modified by reflecting 'the result rendered in step 318.' That is, 'a result rendered in step 312' corresponding to 'the result rendered in step 318' is replaced with 'the result rendered in step 318,' and 'a result rendered in step 318' not corresponding to 'the result rendered in step 312' is added to 'the result rendered in step 312.'

For example, it is assumed that the print data input in step 310 includes 10 pages, and after step 312, contents of pages 3 and 7 of the input print data are modified and contents of pages 11 and 12 are added to the input print data.

In this case, in step 318, the rendering unit 112 renders print data of pages 3, 7, 11 and 12. The print data of page 3 rendered in step 312 is replaced with the print data of page 3 rendered in step 318. Likewise, the print data of page 7 rendered in step 312 is replaced with the print data of page 7 rendered in step 318.

In addition, the print data of page 11 rendered in step 318 is added to the print data of page 11 rendered in step 312, and the print data of page 12 rendered in step 318 is added to the print data of page 12 rendered in step 312.

After the rendering unit 112 renders all of the modified print data of the pages 3, 7, 11 and 12, the host 110 can modify the result rendered in step 312 by reflecting the rendered result of the modified print data and sequentially transmit the modified rendered result to the image forming device 150 in page format from the first page.

However, since the start page (page 1) does not exist among the modified pages, the host 110 may sequentially transmit the print data in page format from print data of the start page rendered in step 312 while the rendering unit 112 renders the modified print data of pages 3, 7, 11 and 12. The rendering unit 112 may complete the rendering of the modified print data of pages 3, 7, 11 and 12 while print data of pages 1 and 2 is transmitted to the image forming device 150 and printed.

If it is determined in step 316 that the start page exists among the pages to which the modified print data belongs, in step 320, the rendering unit 112 renders print data of all the pages to which the modified print data belongs and transmits a result modified by reflecting the rendered result on the result rendered in step 312 to the image forming device 150.

That is, the rendered result transmitted in step 320 is 'a result rendered in step 312' modified by reflecting 'the result rendered in step 320.' In other words, 'a result rendered in step 312' corresponding to 'the result rendered in step 320' is replaced with 'the result rendered in step 320,' and 'a result rendered in step 320' not corresponding to 'the result rendered in step 312' is added to 'the result rendered in step 312.'

If it is determined in step 314 that the input print data has not been modified, in step 322, the examination unit 116 transmits the print data rendered in step 312 to the image forming device 150 without modification.

After step 318 or 320, in step 324, the image forming device 150 prints the transmitted 'result rendered in step 312' modified by reflecting 'the result rendered in step 318 or 320.' After step 322, in step 324, the image forming device 150 prints the transmitted 'result rendered in step 312.'

Exemplary embodiments of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, by a high speed printing method and apparatus according to exemplary embodiments of the present invention, a host performs pre-rendering before a print request is input, and when the print request is input, an image forming device receives the rendered result from the host and prints the rendered result. Thus, the image forming device can perform a printing job at a high speed regardless of the amount of print data.

While the present invention has been particularly shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A high speed printing method comprising:
opening a document to be printed;
generating rendered data by rendering print data of the document to be printed and storing the generated rendered data;
receiving a print request corresponding to the document to be printed;
determining whether any of the print data has been modified since the rendered data was generated, and if it is determined that some of the print data has been modified, then determining whether a start page exists among the modified print data, wherein if a start page does not exist among the modified print data, then transmitting rendered data of the start page to be printed while generating another rendered data of the modified print data, and then transmitting said another rendered data; and
printing the rendered data and said another rendered data as they are received,
wherein the opening of the document, the generating of the rendered data and said another rendered data, and the receiving of the print request are performed by a host, and the printing of the stored rendered data and said another rendered data is performed by an image forming device connected to the host.

2. The method of claim 1, wherein the generating of the rendered data is performed by clicking at least one of a displayed icon and menu.

3. The method of claim 1, wherein the generating of the rendered data is performed by at least one of a driver of the image forming device and a application program, which is installed in the host.

4. The method of claim 1, further comprising, if the print data is modified after the rendered data is generated, the generating another rendered data of the modified print data comprises rendering pages comprising modified print data and storing the generated another rendered data of the modified pages.

5. The method of claim 4, wherein the generated rendered data is replaced with said another rendered data.

6. The method of claim 4, wherein said another generated rendered data is added to the rendered data.

7. The method of claim 1, further comprising, after the printing of the stored rendered data, deleting at least one of the rendered data and said another rendered data.

8. The method of claim 1, wherein the storing of the rendered data is performed by at least one of the host and the image forming device.

9. A high speed printing apparatus comprising:
 a host for generating rendered data by rendering print data in response to a pre-rendering request signal and transmitting the rendered data in response to a print request signal; and
 an image forming device for forming an image of the transmitted rendered result;
 wherein the pre-rendering request signal is generated earlier than the print request signal and wherein in response to the print request signal the host determines whether any of the print data has been modified since the print data was rendered, and if it is determined that some of the print data has been modified, then the host further determines whether a start page exists among the print data that has been modified, wherein if a start page does not exist among the modified print data, the host then transmits rendered data of the start page to be printed while generating another rendered data of the modified print data, and subsequently transmits said another rendered data.

10. A non-transitory computer-readable recording medium storing a computer-readable program for executing a high speed printing method comprising:
 opening a document to be printed;
 generating rendered data by rendering print data of the document to be printed and storing the generated rendered data;
 receiving a print request corresponding to the document to be printed;
 determining whether any of the print data has been modified since the rendered data was generated, and if it is determined that some of the print data has been modified, then determining whether a start page exists among the print data that has been modified, wherein if a start page does not exist among the modified print data, then transmitting rendered data of the start page to be printed while generating another rendered data of the modified print data, and transmitting said another rendered data; and
 printing the rendered data and said another rendered data as they are received,
 wherein the opening of the document, the generating of the rendered data and said another rendered data, and the inputting of the print request are performed by a host, and the printing of the stored rendered data is performed by an image forming device connected to the host.

11. The apparatus of claim 9, wherein the host comprises a rendering unit for rendering print data in response to the pre-rendering request signal.

12. The apparatus of claim 9, wherein the host comprises a storage unit for storing the transmitted rendered data.

13. The apparatus of claim 9, wherein the host comprises an examination unit for determining whether the pre-rendering request signal is a first pre-rendering request signal in accordance with the print data to be rendered.

14. The apparatus of claim 13, wherein the examination unit determines whether the print data has been modified since the rendering of the print data.

15. The apparatus of claim 14, wherein the rendering unit renders the modified print data.

16. A high speed printing apparatus comprising a host, the apparatus comprising:
 a rendering unit for generating rendered data by rendering print data in response to a pre-rendering request signal and transmitting the rendered data in response to a print request signal;
 a storage unit for storing the transmitted rendered data; and
 an examination unit for examining whether the pre-rendering signal is at least one of a first input pre-rendering request signal corresponding to current print data and whether the current print data has been modified, wherein if it is determined that the current print data has been modified since the rendered data was generated, the examination unit determines whether a start page exists among the print data that has been modified, wherein if a start page does not exist among the modified print data, rendered data of the start page is transmitted to be printed while generating another rendered data of the modified print data.

17. The apparatus of claim 16, further comprising an image forming device for receiving the rendered data and said another rendered data from at least one of the rendering unit and the examination unit, and printing the received rendered data and said another rendered data.

* * * * *